US009772018B2

(12) United States Patent
Aizawa et al.

(10) Patent No.: US 9,772,018 B2
(45) Date of Patent: Sep. 26, 2017

(54) WORKING MACHINE

(71) Applicant: KUBOTA CORPORATION, Osaka (JP)

(72) Inventors: Tsutomu Aizawa, Osaka (JP); Makoto Noguchi, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 561 days.

(21) Appl. No.: 14/178,799

(22) Filed: Feb. 12, 2014

(65) Prior Publication Data
US 2014/0290236 A1  Oct. 2, 2014

(30) Foreign Application Priority Data

Mar. 27, 2013 (JP) ................................. 2013-066533
Mar. 27, 2013 (JP) ................................. 2013-066534

(51) Int. Cl.
*F16H 61/433* (2010.01)
*F16H 39/02* (2006.01)
(Continued)

(52) U.S. Cl.
CPC ............. *F16H 39/02* (2013.01); *B60W 10/06* (2013.01); *F16H 61/431* (2013.01); *F16H 61/47* (2013.01);
(Continued)

(58) Field of Classification Search
CPC ..... E02F 9/2066; E02F 9/2246; E02F 9/2253; F16H 61/42; F16H 39/02; B60W 10/30; B60W 10/06; B60W 20/16
(Continued)

(56) References Cited

U.S. PATENT DOCUMENTS 4,640,095 A * 2/1987 Engel .................... F04B 49/065
                                                137/596.17
5,335,750 A * 8/1994 Geringer ................ B60K 17/10
                                                180/307
(Continued)

FOREIGN PATENT DOCUMENTS

JP        6-64460     3/1994
JP       08-040223    2/1996
(Continued)

OTHER PUBLICATIONS

American Society of Engineers (Extracted from USA Standard "Graphic Symbols for Fluid Power Diagrams" (USAS y32.10-1967), The American Society of Engineers, United Engineering Center, New York.).*

(Continued)

*Primary Examiner* — Edelmira Bosques
*Assistant Examiner* — Richard Drake
(74) *Attorney, Agent, or Firm* — Greenblum & Bernstein, P.L.C.

(57) ABSTRACT

There is provided a working machine which is capable of vehicle speed control through accelerator pedal operation even during execution of work under a condition where engine rotational speed is maintained constant. The working machine has the normal mode for exercising vehicle speed control by controlling engine rotational speed on the basis of the amount of depression of the accelerator pedal and by controlling the swash plate of the HST pump on the basis of the engine rotational speed, and the attachment mode for exercising vehicle speed control by controlling the swash plate of the HST pump on the basis of the amount of depression of the accelerator pedal irrespective of engine rotational speed.

5 Claims, 6 Drawing Sheets

(51) Int. Cl.
*B60W 10/06* (2006.01)
*F16H 61/431* (2010.01)
*F16H 61/47* (2010.01)

(52) U.S. Cl.
CPC . *B60W 2540/10* (2013.01); *B60W 2710/0644* (2013.01); *F16H 2312/10* (2013.01)

(58) Field of Classification Search
USPC .......................................... 60/431, 490, 443
See application file for complete search history.

(56) References Cited

U.S. PATENT DOCUMENTS

| | | | | |
|---|---|---|---|---|
| 5,620,393 | A * | 4/1997 | Minowa | B60K 28/165 477/155 |
| 6,405,530 | B1 * | 6/2002 | Brimeyer | F04B 49/002 60/444 |
| 7,664,586 | B2 * | 2/2010 | Ozawa | E02F 9/2235 180/14.1 |
| 7,962,768 | B2 * | 6/2011 | Grill | E02F 9/2235 701/50 |
| 8,386,136 | B2 * | 2/2013 | Shirao | B60W 10/06 701/50 |
| 8,646,263 | B2 * | 2/2014 | Shirao | F16H 61/421 60/327 |
| 8,924,100 | B2 * | 12/2014 | Imura | B60W 10/06 701/36 |
| 9,091,040 | B2 * | 7/2015 | Peterson | F16H 61/431 |
| 2009/0320462 | A1 * | 12/2009 | Ohtsukasa | E02F 9/2235 60/431 |
| 2010/0106382 | A1 | 4/2010 | Kodaka | |
| 2015/0112577 | A1 * | 4/2015 | Velusamy | F02D 41/2422 701/110 |

FOREIGN PATENT DOCUMENTS

| | | |
|---|---|---|
| JP | 8-135789 | 5/1996 |
| JP | 9-2100 | 1/1997 |
| JP | 10-1062 | 1/1998 |
| JP | 2001-254826 | 9/2001 |
| JP | 2005-280392 | 10/2005 |
| JP | 2006-321625 | 11/2006 |
| JP | 2007-218359 | 8/2007 |
| JP | 2008-215084 | 9/2008 |
| JP | 2010-77935 | 4/2010 |
| WO | WO2008/111655 | 9/2008 |

OTHER PUBLICATIONS

Hydraulics and Pneumatics ("Book 2, Chapter 21: Servovalve circuits", <e-publication, Oct. 15, 2010> retreived on May 19, 2016 from: <URL: http://hydraulicspneumatics.com>).*

Office Action issued in counterpart JP application No. JP 2013-066533.

Office Action issued in counterpart JP application No. JP 2013-066534.

* cited by examiner

WORKING MACHINE

TECHNICAL FIELD

The present invention relates to a working machine such as a wheel loader.

BACKGROUND ART

Heretofore known working machines include a wheel loader as described in JP-A 8-40223 (1996).

This wheel loader comprises a front machine body having front wheels, and a rear machine body having rear wheels. The front machine body has a working device, and the rear machine body is equipped with an engine and a HST (hydrostatic transmission).

The working device has a lift arm which is free to rock up and down, and a bucket disposed on the front-end side of the lift arm for free rocking motion. Instead of the bucket, another attachment can be fitted to the front-end side of the lift arm.

The HST has a HST pump constructed of a swash plate-type variable displacement pump which is driven by an engine, and a HST motor which makes a closed-circuit connection with the HST pump via a pair of speed-change oil passages. The HST motor is driven with oil discharged from the HST pump, and, the rear wheel is driven by rotational power output produced from the HST motor. By making changes to the angle of the swash plate of the HST pump, it is possible to vary the discharge direction, as well as the rate of discharge flow, of hydraulic oil discharged from the HST pump, and thereby permit forward or backward movement of the wheel loader while varying vehicle speed in a stepless manner.

Moreover, the wheel loader has an accelerator pedal. Through the depressing operation of the accelerator pedal, engine rotational speed is controlled, and, as the engine rotational speed is changed, a control pressure for the control of the swash plate of the HST pump is varied. Vehicle speed is controlled on the basis of the engine rotational speed and the control pressure for the swash plate.

In addition, the wheel loader has an inching pedal for decelerating and stopping the wheel loader. The inching pedal is designed to reduce the angle of the swash plate of the HST pump when it is stepped on, for allowing deceleration and stop of the wheel loader.

SUMMARY OF THE INVENTION

Problems to be Solved by the Invention

In the wheel loader as above described, normal travel control is effected through the operation of the accelerator pedal. That is, as the degree of depression of the accelerator pedal is increased, the vehicle speed becomes increasingly higher, and on the other hand, as the degree of depression of the accelerator pedal is decreased, the vehicle speed becomes increasingly lower.

Furthermore, in a case where, instead of the bucket, an attachment in which a driving section needs to be rotated at fixed speed, such for example as a sweeper (cleaning device) or a mower (lawn mower), is installed in the wheel loader, work is carried out while keeping engine rotational speed constant. In this case, travel control cannot be effected by the accelerator pedal, wherefore the inching pedal is used for the travel control.

In the case of exercising travel control by the inching pedal, upon returning (releasing) the inching pedal in a depressed state, the wheel loader starts to move, and, when it is desired to stop the wheel loader, the inching pedal is stepped on.

That is, the travel control by the inching pedal is the reverse of the travel control by the accelerator pedal. This gives rise to the problem of difficulty in vehicle speed adjustment for an inexperienced user.

The present invention has been devised in view of the problem as mentioned supra, and accordingly an object of the present invention is to provide a working machine which is capable of vehicle speed control through accelerator pedal operation even during execution of work under a condition where engine rotational speed is maintained constant.

Means for Solving the Problem

The following are the features of technical measure taken by the present invention to solve the foregoing problem.

In the invention, there is provided a working machine comprising:

a HST pump constructed of a swash plate-type variable displacement pump which is driven by an engine;

a HST motor making a closed-circuit connection with the HST pump via a pair of speed-change oil passages, for driving a traveling device by being driven with oil discharged from the HST pump;

a control unit for controlling the engine and the HST pump; and an accelerator pedal for controlling vehicle speed, the control unit having a normal mode for exercising vehicle speed control by controlling engine rotational speed on the basis of an amount of depression of the accelerator pedal and by controlling a swash plate of the HST pump on the basis of the engine rotational speed, and an attachment mode for exercising vehicle speed control by controlling the swash plate of the HST pump on the basis of the amount of depression of the accelerator pedal irrespective of engine rotational speed.

In the invention, the working machine further comprises:

a servo cylinder for controlling the swash plate of the HST pump;

a swash-plate control valve constructed of an electromagnetic proportional valve, for feeding hydraulic oil from a hydraulic pump which is driven by an engine to the servo cylinder as a control pressure for the swash plate; and an accelerator position sensor for detecting an amount of operation of the accelerator pedal, and inputting the detected amount to the control unit, wherein, in the normal mode, a command signal is outputted from the control unit to the engine in a manner such that engine rotational speed will be controlled on the basis of the amount of depression of the accelerator pedal, and also a command signal is outputted from the control unit to the swash-plate control valve in a manner such that the control pressure for the swash plate of the HST pump will be controlled on the basis of engine rotational speed, and wherein, in the attachment mode, a command signal is outputted from the control unit to the swash-plate control valve in a manner such that the control pressure for the swash plate of the HST pump will be controlled on the basis of the amount of depression of the accelerator pedal.

In the invention, the working machine further comprises:

an inching pedal; and an inching position sensor for detecting an amount of operation of the inching pedal, and inputting the detected amount to the control unit, wherein, in the normal mode and the attachment mode, a command signal is outputted from the control unit to the swash-plate control valve in a manner such that the control pressure for the swash plate of the HST pump will be lowered through depressing operation of the inching pedal.

In the invention, the working machine further comprises:

an accelerator setting member for setting engine rotational speed at a predetermined speed level in the attachment mode.

In the invention, the working machine further comprises:

a working device for execution of work, wherein the control unit is capable of controlling engine rotational speed on the basis of first to third control characteristic lines that define relationship between the amount of operation of the accelerator pedal and engine rotational speed, and wherein the control unit comprises:

a first engine speed control section for controlling engine rotational speed in accordance with the working speed-oriented first control characteristic line during execution of work with the working device;

a second engine speed control section for controlling engine rotational speed in accordance with the fuel economy-oriented second control characteristic line when a travel load is smaller than a predetermined load on a run; and a third engine speed control section for controlling engine rotational speed in accordance with the third control characteristic line located between the first control characteristic line and the second control characteristic line when a travel load is greater than or equal to the predetermined load on a run.

In the invention, the working machine further comprises:

a servo cylinder for controlling the swash plate of the HST pump;

a swash-plate control valve constructed of an electromagnetic proportional valve, for feeding hydraulic oil from a hydraulic pump which is driven by an engine to the servo cylinder as a control pressure for the swash plate;

an inching pedal for decreasing vehicle speed; and an inching position sensor for detecting an amount of depression of the inching pedal, and inputting the detected amount to the control unit, wherein the swash-plate control valve is controlled under a command signal outputted from the control unit in a manner such that the control pressure for the swash plate will be lowered through depressing operation of the inching pedal, and wherein the first engine speed control section controls engine rotational speed in accordance with the first control characteristic line during the operation of the inching pedal.

In the invention, the working machine is capable of selection between the normal mode and an economical mode, and, in the normal mode, engine rotational speed is controlled in accordance with the first control characteristic line alone, and, in the economical mode, engine rotational speed is controlled by the first to third engine speed control sections.

Advantageous Effects of the Invention

The present invention affords the following effects.

According to the invention, in the normal mode, engine rotational speed is controlled on the basis of the amount of depression of accelerator pedal, and the swash plate of the HST pump is controlled on the basis of the engine rotational speed. This makes it possible to exercise vehicle speed control through usual accelerator pedal operation; that is, makes it possible to control vehicle speed while adjusting engine rotational speed through the depressing operation of the accelerator pedal.

Moreover, in the attachment mode, the swash plate of the HST pump is controlled on the basis of the amount of depression of the accelerator pedal irrespective of engine rotational speed. This makes it possible to control vehicle speed through the depressing operation of the accelerator pedal even under a condition where engine rotational speed is maintained constant. Accordingly, even in the case of using an attachment in which a driving section needs to be rotated at fixed speed, vehicle speed can be controlled through the same operation as usual accelerator pedal operation.

According to the invention, it is possible to facilitate implementation of a system capable of selection between a method for exercising vehicle speed control by controlling engine rotational speed through the depressing operation of the accelerator pedal and a method for exercising vehicle speed control by controlling the swash plate of the HST pump through the depressing operation of the accelerator pedal irrespective of engine rotational speed.

According to the invention, vehicle speed can be decreased satisfactorily both in the normal mode and in the attachment mode.

According to the invention, in the attachment mode, engine rotational speed can be set at a predetermined speed level with the accelerator setting member.

According to the invention, during execution of work with the working device, engine rotational speed is controlled in accordance with the working speed-oriented first control characteristic line, wherefore work can be carried out with high efficiency.

Moreover, on a run, engine rotational speed is controlled in accordance with the fuel economy-oriented second control characteristic line when a travel load is smaller than a predetermined load, wherefore fuel efficiency can be improved.

In addition, on a run, engine rotational speed is controlled in accordance with the third control characteristic line located between the first control characteristic line and the second control characteristic line when a travel load is greater than or equal to the predetermined load. Accordingly, even if a travel load becomes greater than or equal to the predetermined load frequently during engine speed control in accordance with the second control characteristic line, a reduction in fuel consumption can be achieved.

As described heretofore, it is possible to provide a working machine capable of both enhancement in fuel efficiency and highly efficient execution of work.

According to the invention, the amount of depression of the inching pedal is detected by the inching position sensor, and the detected amount is inputted to the control unit. Then, a command signal can be outputted from the control unit to the swash-plate control valve in a manner such that the control pressure for the swash plate of the HST pump will be lowered on the basis of the amount of depression of the inching pedal. Moreover, since the inching pedal is used for work with the working device, it is possible to utilize the detection of pedal depressing operation by the inching position sensor to identify execution of work.

Thus, the first engine speed control section controls engine rotational speed in accordance with the first control characteristic line during the operation of the inching pedal.

This makes it possible to eliminate the need for providing extra detection means to identify execution of work, and thereby achieve machine construction at low cost.

According to the invention, operators are able to make a choice between the normal mode which is travel speed and working speed oriented and the economical mode which allows a reduction in fuel consumption. This is very convenient for operators.

MODES FOR CARRYING OUT THE INVENTION

Hereinafter, embodiments of the present invention will be explained with reference to the drawings.

Figure 1:
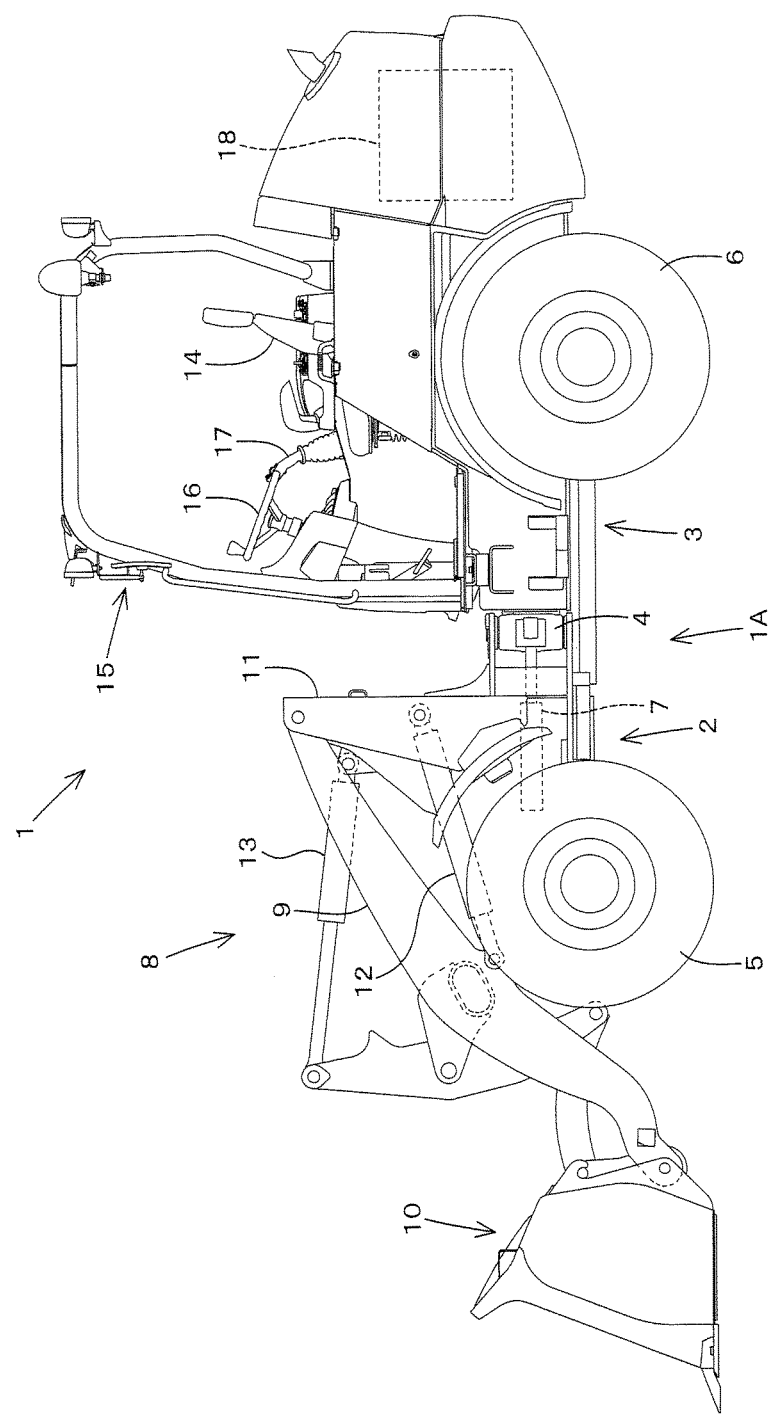
FIG. 1 is a side view of a wheel loader.

FIG. 1 illustrates a wheel loader 1 as a working machine.

The wheel loader 1 is an articulated-type working machine, and its traveling machine body 1A is composed of a front body 2 and a rear body 3. The front body 2 has a pair of right-hand and left-hand front wheels 5, and the rear body 3 has a pair of right-hand and left-hand rear wheels 6.

On the front-end side of the rear body 3 is disposed a coupling member 4 for free rotation about an axis mounted in a front-rear direction, or the front-rear axis, within a predetermined range of rotation, and, the rear-end side of the front body 2 is coupled to the coupling member 4 for free side-to-side rocking motion about an axis mounted in a top-bottom direction, or the vertical axis.

A steering cylinder 7 constructed of a hydraulic cylinder is disposed across the coupling member 4 and the front body 2. With the telescopic motion of the steering cylinder 7, the front body 2 is rocked from side to side relative to the rear body 3, thereby imparting side-to-side swivel motion to the wheel loader 1.

Moreover, the front body 2 is provided with a working device 8 (front working device). The working device 8 comprises a pair of right-hand and left-hand lift arms 9 and a bucket 10. The right-hand, left-hand lift arm 9 is, at its base-end side, supported for free rotation about an axis mounted in a right-left direction, or the horizontal axis, by a support frame 11 mounted in the front body 2, so that it can be rocked up and down. The bucket 10 is pivotally coupled to the front-end side of the right-hand, left-hand lift arm 9 for free rocking motion about the horizontal axis. The right-hand, left-hand lift arm 9 is driven by a lift cylinder 12, and the bucket 10 is driven by a bucket cylinder 13. The lift cylinder 12 and the bucket cylinder 13 are each constructed of a hydraulic cylinder.

Moreover, the bucket 10 is detachably installed, so that other attachment than the bucket 10, such for example as a sweeper, a mower, or a breaker can be attached to the front-end side of the lift arm 9.

The rear body 3 is provided with a driver's sheet 14, a four-post canopy 15 acting as a driver's sheet protective device, a steering wheel 16 for operating the steering cylinder 7, a working-device operation lever 17 for operating the working device 8, and an engine 18 (diesel engine).

Figure 2:
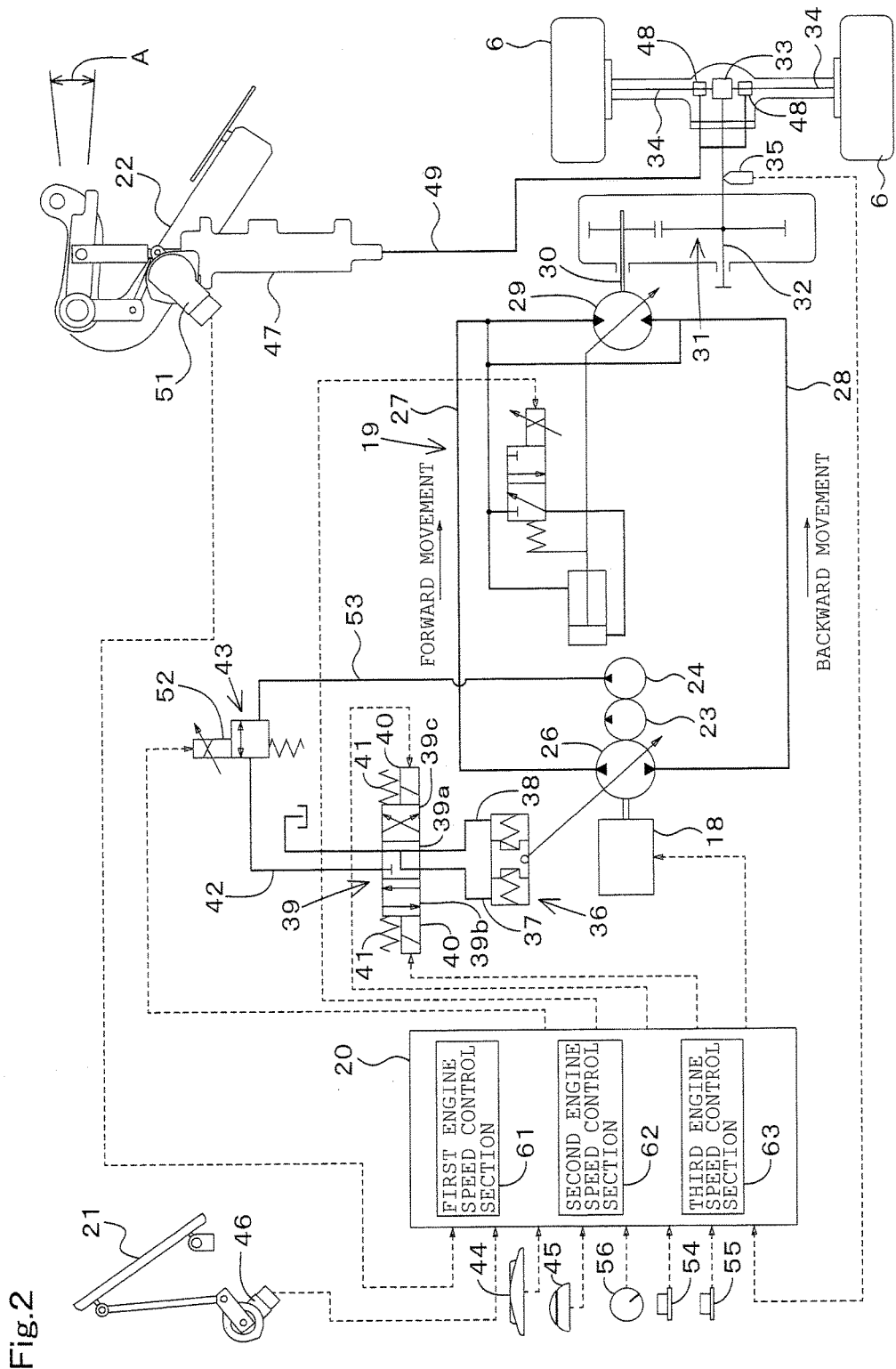
FIG. 2 is a block diagram showing part of the hydraulic circuit and the electric control system of the wheel loader.

FIG. 2 shows part of the hydraulic circuit and the electric control system of the wheel loader 1.

In FIG. 2, a numeral 18 represents an engine, a numeral 19 represents a HST (hydrostatic transmission) for traveling device, a numeral 20 represents a control unit for controlling the engine 18 and the HST 19, a numeral 21 represents an accelerator pedal for increasing and decreasing the speed of the wheel loader 1, a numeral 22 represents an inching pedal for decelerating and stopping the wheel loader 1, a numeral 23 represents a main pump, and a numeral 24 represents a sub pump (charge pump).

The HST 19 comprises a HST pump 26 which is driven by the engine 18, and a HST motor 29 which makes a closed-circuit connection with the HST pump 26 via a pair of speed-change oil passages 27 and 28. The HST motor 29 is driven with oil discharged from the HST pump 26, and, in this embodiment, the front wheel 5 and the rear wheel 6 are driven under rotational power outputted from the HST motor 29.

The HST pump 26 is constructed of a swash plate-type variable displacement pump. By making changes to the angle of the swash plate of the HST pump 26, it is possible to vary the discharge direction, as well as the rate of discharge flow, of hydraulic oil discharged from the HST pump. Thereby, in this construction, the rotational speed of the output shaft of the HST motor 29 can be varied (the vehicle speed of the wheel loader 1 can be varied) in a stepless manner in a direction to move the wheel loader 1 forward (a direction to cause normal rotation of the HST motor 29) or in a direction to move the wheel loader 1 backward (a direction to cause reverse rotation of the HST motor 29).

The HST motor 29 is constructed of a swash plate-type variable displacement motor, in which the angle of the swash plate of the HST motor 29 (the tilting angle of the swash plate) can be controlled under a command signal from the control unit 20, and HST braking force can be exerted by increasing the angle of the swash plate of the HST motor 29. Power is transmitted from an output shaft 30 of the HST motor 29 to a transmission shaft 32 via a gear transmission mechanism 31, and is then transmitted from the rear-end side of the transmission shaft 32 to right-hand and left-hand rear axles 34 via a rear-wheel differential device 33, and eventually the power is transmitted from the rear axles 34 to the rear wheels 6, thereby driving the rear wheels 6. Also, the power is transmitted from the front-end side of the transmission shaft 32 to the front wheels 5 via a drive shaft, a front-wheel differential device, front axles, and so forth, thereby driving the front wheels 5.

The front and rear wheels 5 and 6, a support case for supporting the front and rear wheels 5 and 6, a power transmission system for transmitting power from the HST motor 29 to the front and rear wheels 5 and 6, and so forth constitute the traveling device.

The rotational speed of the transmission shaft 32 can be detected by a rotation sensor 35. The rotation sensor 35 is connected to the control unit 20, so that a value detected by the rotation sensor 35 can be inputted to the control unit 20. In the control unit 20, vehicle speed calculation is performed on the basis of the detected value from the rotation sensor 35.

When an actual vehicle speed obtained on the basis of the detected value from the rotation sensor 35 is lower than a target vehicle speed which is derived from a command value of engine rotational speed outputted from the control unit 20 (that is, when there is a decrease in vehicle speed), then it is judged that a travel load is imposed on the wheel loader 1. Moreover, the degree of the travel load is determined on the basis of the difference between the target vehicle speed and the actual vehicle speed.

As used herein, the term "travel load" refers to a load which is imposed on the wheel loader 1 on an uphill slope run, on entrance into a corner, or on other occasions.

The swash plate of the HST pump 26 is subjected to angular change operation by a servo cylinder 36. The servo cylinder 36 is connected to a forward-backward selector valve 39 via a forward oil passage 37 and a backward oil passage 38. The forward-backward selector valve 39, which is constructed four-port three-position-type electromagnetic selector valve, is held in a neutral position 39a by a spring 41 upon demagnetization of a solenoid 40. In response to an excitation signal from the control unit 20, the forward-backward selector valve 39 is shifted from the neutral position 39a to a forward-travel position 39b or a backward-travel position 39c.

Upon shifting the forward-backward selector valve 39 to the forward-travel position 39b, the swash plate of the HST pump 26 becomes tiltable for allowing the normal rotation of the HST motor 29. On the other hand, upon shifting the forward-backward selector valve 39 to the backward-travel position 39c, the swash plate of the HST pump 26 becomes tiltable for allowing the reverse rotation of the HST motor 29.

The forward-backward selector valve 39 is connected to a swash-plate control valve 43 via a control-pressure supply passage 42. The swash-plate control valve 43 is designed to control the pressure of pressure oil which is fed to the servo cylinder 36 (control pressure for the swash plate of the HST pump 26). The swash-plate control valve 43, which is constructed of an electromagnetic proportional valve, is capable of controlling the pressure of pressure oil which is fed to the servo cylinder 36 under a command signal (a command current value) from the control unit 20.

The control unit 20 is connected with a forward-backward selector switch 44, and, through the operation of the forward-backward selector switch 44, the forward-backward selector valve 39 is energized, so that it can be shifted to the forward-travel position 39b or the backward-travel position 39c.

The control unit 20 is also connected with a neutral switch 45, and, through the operation of the neutral switch 45, the forward-backward selector valve 39 is demagnetized, so that it can be shifted from the forward-travel position 39b or the backward-travel position 39c to the neutral position 39a.

The accelerator pedal 21 is designed to control vehicle speed through its depressing operation. The amount of depression (the degree of depression) of the accelerator pedal 21 is detected by an accelerator position sensor 46 constructed of a potentiometer. The accelerator position sensor 46 is connected to the control unit 20, so that a detected value (the amount of depression of the accelerator pedal 21) from the accelerator position sensor 46 can be inputted to the control unit 20.

The inching pedal 22, which is capable of depressing operation, is designed so that, after it is stepped on in a predetermined depression amount, by further depressing operation, a master cylinder 47 for braking can be actuated. The range of operation of the inching pedal that extends from a state where the inching pedal 22 is not stepped on to a state just prior to actuation of the master cylinder 47 will be referred to as "inching operation range A".

The master cylinder 47 is connected, via a braking oil passage 49, to a braking mechanism 48 for braking the rear axle 34, and, by actuating the master cylinder 47 through the operation of the inching pedal 22, the braking mechanism 48 is operated to brake the right-hand, left-hand rear axle 34.

The amount of depression (the degree of depression) of the inching pedal 22 is detected by an inching position sensor 51 constructed of a potentiometer. The inching position sensor 51 is connected to the control unit 20, so that a detected value (the amount of depression of the inching pedal 22) from the inching position sensor 51 can be inputted to the control unit 20.

In the inching operation range A, a command signal is outputted from the control unit 20 to a solenoid 52 of the swash-plate control valve 43 in a manner such that the control pressure for the swash plate of the HST pump 26 will be lowered as the inching pedal 22 is stepped on.

The main pump 23 and the sub pump 24 are each constructed of a fixed displacement hydraulic pump which is driven by the power of the engine 18. The main pump 23 acts to feed hydraulic oil to hydraulic actuators (such for example as the steering cylinder 7, the lift cylinder 12, and the bucket cylinder 13) mounted in the wheel loader 1 and the hydraulic actuator of an attachment installed in the wheel loader 1 instead of the bucket 10.

The sub pump 24 is connected to the swash-plate control valve 43 via a hydraulic-oil supply passage 53, for feeding hydraulic oil to the servo cylinder 36. Moreover, the sub pump 24 acts to feed pressure oil to a pilot valve for operating a pilot control valve for controlling the hydraulic actuators, a charge circuit for replenishing the speed-change oil passage 27, 28 on the low-pressure side of the HST with hydraulic oil, and so forth.

The control unit 20 has a normal mode, an attachment mode, and an economical mode. At the start of actuation of the engine 18, the control unit 20 stays in the normal mode. The control unit 20 in this mode switches to the attachment mode through the operation of an attachment-mode switch 54, or switches to the economical mode through the operation of an economical-mode switch 55. The attachment-mode switch 54 and the economical-mode switch 55 are connected to the control unit 20.

Figure 3A:
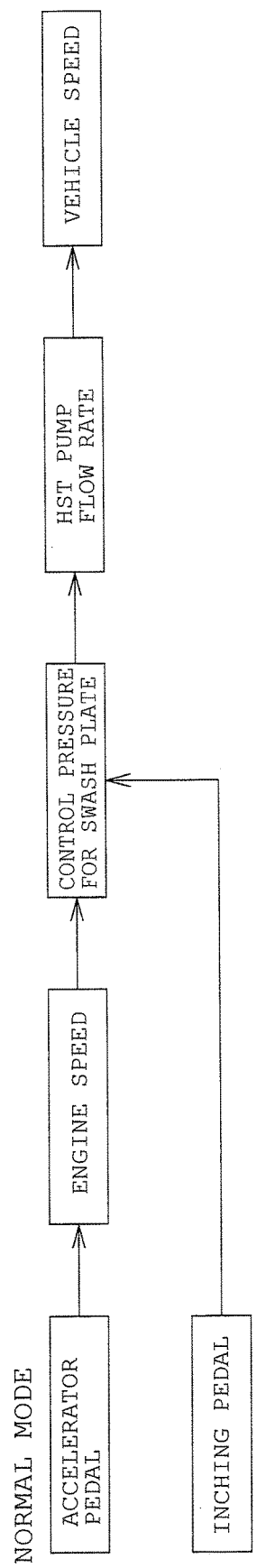
FIG. 3A is a block diagram showing a vehicle-speed control system in the normal mode.

In the normal mode, as shown in FIG. 3A, the number of revolutions, or the rotational speed of the engine 18 (target engine speed) is controlled by the accelerator pedal 21. More specifically, when the accelerator pedal 21 is not stepped on, the rotational speed of the engine 18 conforms to an idling speed. Then, a command signal is outputted from the control unit 20 to the engine 18 in a manner such that, as the accelerator pedal 21 is stepped on, the rotational speed of the engine 18 will be increased correspondingly, and on the other hand, as the accelerator pedal 21 is released, the rotational speed of the engine 18 will be decreased correspondingly.

Moreover, in the normal mode, the control pressure for the swash plate of the HST pump 26 is controlled on the basis of the rotational speed of the engine 18. More specifically, a map bearing characteristic lines indicating the relationship between engine rotational speed and control pressure for the swash plate of the HST pump 26 is incorporated in the control unit 20, and, in conformity to the map, a command signal is outputted from the control unit 20 to the solenoid 52 of the swash-plate control valve 43 in a manner such that the control pressure for the swash plate of the HST pump 26 will be brought into correspondence with the rotational speed of the engine 18 (the swash-plate control valve 43 is controlled by the control unit 20 in a manner such that the control pressure for the swash plate of the HST pump 26 will be raised with an increase in engine rotational speed, whereas the control pressure for the swash plate of the HST pump 26 will be lowered with a decrease in engine rotational speed).

Thus, in the normal mode, under a condition where the inching pedal 22 is not stepped on, the rate of discharge flow from the HST pump 26 is determined according to engine rotational speed (rotations of the HST pump 26) based on depression of the accelerator pedal 21 and the control pressure for the swash plate of the HST pump 26 based on the engine rotational speed, for determination of vehicle speed.

In the normal mode, when the forward-backward selector valve 39 assumes the neutral position, the servo cylinder 36 is brought into balance so as to keep the swash plate angle of the HST pump 26 (the tilting angle of the swash plate) at a minimum, so that hydraulic oil will not be discharged from the HST pump 26.

In the case of shifting the forward-backward selector valve 39 from the neutral position 39a to the forward-travel position 39b or the backward-travel position 39c, when the engine rotational speed conforms to an idling speed, the control pressure for the swash plate of the HST pump 26 stands at a minimum (the swash plate angle of the HST pump 26 is the smallest), and the wheel loader 1 remains at rest.

In this state, upon stepping on the accelerator pedal 21, the engine rotational speed is increased, and also the control pressure for the swash plate of the HST pump 26 is raised, with a consequent increase in the swash plate angle, thereby effecting forward or backward movement. Furthermore, when the accelerator pedal 21 is fully depressed to maximize the engine rotational speed, the control pressure for the swash plate of the HST pump 26 rises to a maximum.

Moreover, upon stepping on the inching pedal 22 during the depressing operation of the accelerator pedal 21, a command signal is outputted from the control unit 20 to the solenoid 52 of the swash-plate control valve 43 in a manner such that the control pressure for the swash plate of the HST pump 26 will be lowered. In consequence, the swash plate angle of the HST pump 26 decreases, and the wheel loader 1 slows down, with the rotational speed of the engine 18 remaining at a level determined through the operation of the accelerator pedal 21.

Figure 3B:
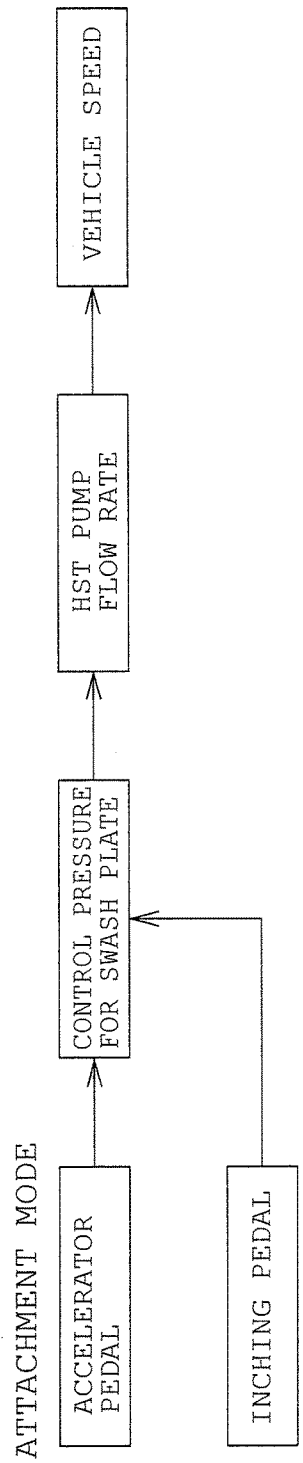
FIG. 3B is a block diagram showing a vehicle-speed control system in the attachment mode.

Meanwhile, in the attachment mode, as shown in FIG. 3B, even if the accelerator pedal 21 is stepped on, the rotational speed of the engine 18 remains unchanged. In this case, as the accelerator pedal 21 is stepped on, in response to the amount of pedal depression, a command signal is outputted from the control unit 20 to the solenoid 52 of the swash-plate control valve 43 in a manner such that the control pressure for the swash plate of the HST pump 26 will be changed in accordance with the amount of depression of the accelerator pedal 21. That is, in the attachment mode, the swash plate of the HST pump 26 is controlled on the basis of the amount of depression of the accelerator pedal 21 irrespective of the rotational speed of the engine 18. A command signal is outputted from the control unit 20 to the solenoid 52 of the swash-plate control valve 43 in a manner such that, when the accelerator pedal 21 is not stepped on, the control pressure for the swash plate of the HST pump 26 will be minimized. Also, a command signal is outputted from the control unit 20 to the swash-plate control valve 43 in a manner such that, as the accelerator pedal 21 is stepped on, the control pressure for the swash plate of the HST pump 26 will be raised (the swash plate angle of the HST pump 26 will be increased).

In the attachment mode, the setting of the rotational speed of the engine 18 is made by means of an accelerator setting dial 56 (accelerator setting member). More specifically, the accelerator setting dial 56 is connected to the control unit 20, so that a command signal can be outputted from the control unit 20 to the engine 18 in a manner such that the rotational speed of the engine 18 will conform to the engine rotational speed determined by the accelerator setting dial 56. Moreover, through the turning operation of the accelerator setting dial 56, the setting of the rotational speed of the engine 18 can be changed in a step-by-step manner or a stepless manner within the range of, for example, 1700 rpm to 2400 rpm, and also the rotational speed of the engine 18 can be maintained at a preset level.

In the attachment mode, when the forward-backward selector valve 39 assumes the neutral position 39a, just as with the normal mode, the swash plate angle of the HST pump 26 stands at a minimum, wherefore hydraulic oil will not be discharged from the HST pump 26.

Moreover, even if the forward-backward selector valve 39 is shifted from the neutral position 39a to the forward-travel position 39b or the backward-travel position 39c, and also the engine rotational speed is adjusted to be greater than an idling speed by the accelerator setting dial 56, so long as the accelerator pedal 21 is not stepped on, the control pressure for the swash plate of the HST pump 26 stands at a minimum (the swash plate angle of the HST pump 26 is the smallest). In consequence, neither forward movement nor backward movement will be effected.

In this state, upon stepping on the accelerator pedal 21, the wheel loader 1 is set in motion, and, as the accelerator pedal 21 is further stepped on, the control pressure for the swash plate is controlled in a manner such that the swash plate angle of the HST pump 26 will be increased. In consequence, the wheel loader 1 speeds up. At this time, the rotational speed of the engine 18 remains at the speed level determined by the accelerator setting dial 56.

Moreover, upon stepping on the inching pedal 22 during the depressing operation of the accelerator pedal 21, a command signal is outputted from the control unit 20 to the solenoid 52 of the swash-plate control valve 43 in a manner such that the control pressure for the swash plate of the HST pump 26 will be lowered, and correspondingly the swash plate angle of the HST pump 26 decreases. In consequence, the wheel loader 1 slows down, while maintaining the engine rotational speed determined by the accelerator setting dial 56.

In the normal mode and the attachment mode as well, the final control pressure for the swash plate of the HST pump 26 (current value given to the swash-plate control valve 43 for controlling a control pressure for the swash plate of the HST pump 26) is determined by the expression $Y \times (Z/100)$.

In the expression, Y designates a control pressure for the swash plate of the HST pump 26 that depends on the operation of the accelerator pedal 21, and Z designates the degree of depression of the inching pedal 22 within the inching operation range A. Z is indicative of 100% at the time of release of the inching pedal (under a condition where the inching pedal 22 is not stepped on), whereas indicative of 0% at the time of full depression of the inching pedal within the inching operation range A.

Accordingly, in the normal mode and the attachment mode, irrespective of the amount of depression of the accelerator pedal 21, by stepping on the inching pedal 22 until just before the degree of depression reaches to a level that allows actuation of the master cylinder 47, the control pressure for the swash plate of the HST pump 26 is reduced to a minimum (zero), and the wheel loader 1 comes to a halt.

As described heretofore, in the normal mode, engine rotational speed is controlled on the basis of the amount of depression of accelerator pedal 21, and the swash plate of the HST pump 26 is controlled on the basis of the engine rotational speed. This makes it possible to exercise vehicle speed control through usual accelerator pedal 21 operation; that is, makes it possible to control vehicle speed while adjusting engine rotational speed through the depressing operation of the accelerator pedal 21.

Moreover, in the attachment mode, the swash plate of the HST pump 26 is controlled on the basis of the amount of depression of the accelerator pedal 21 irrespective of engine rotational speed. This makes it possible to control vehicle speed, while keeping engine rotational speed constant, through the depressing operation of the accelerator pedal 21. Accordingly, even in the case of using an attachment in which a driving section needs to be rotated at fixed speed, vehicle speed control can be exercised through the same operation as usual accelerator pedal 21 operation.

Figure 4A:
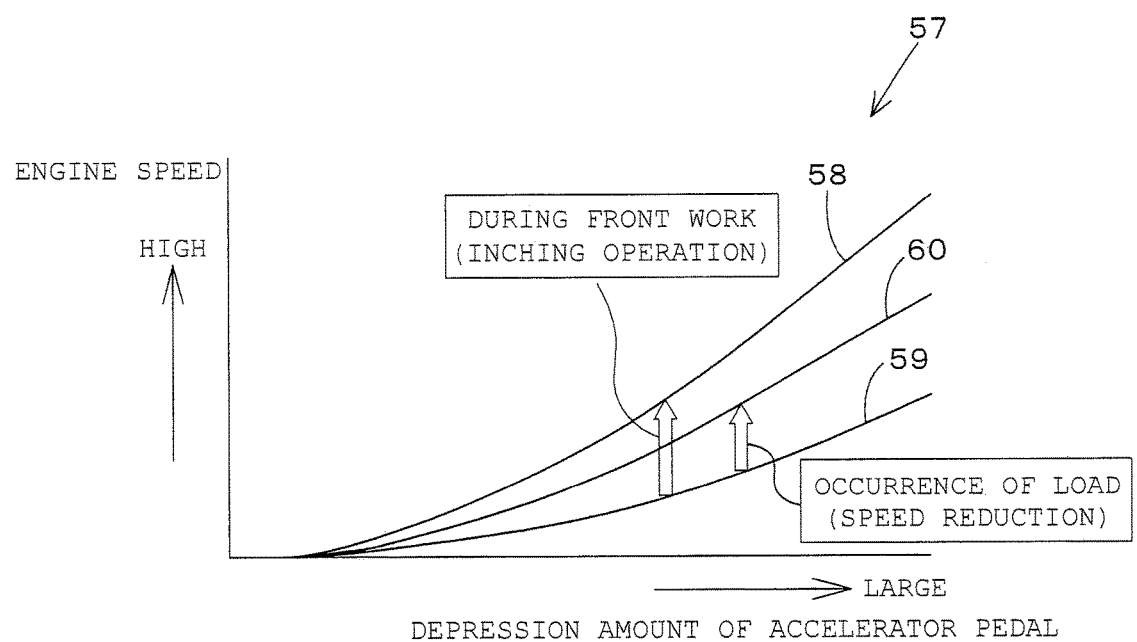
FIG. 4A is an engine speed control map pursuant to the present invention, for defining the relationship between engine rotational speed and the amount of accelerator depression.

In the economical mode, the rotational speed of the engine 18 (target engine speed) is controlled in conformity to an engine speed control map 57 as shown in FIG. 4A. The engine speed control map 57 defines the relationship between the amount of depression of the accelerator pedal 21 and engine rotational speed. In the map, the amount of depression of the accelerator pedal 21 is taken along the abscissa axis, and engine rotational speed is taken along the ordinate axis.

The engine speed control map 57 bears a first control characteristic line 58, a second control characteristic line 59, and a third control characteristic line 60. The control unit 20 comprises a first engine speed control section 61 for controlling engine rotational speed in accordance with the first control characteristic line 58; a second engine speed control section 62 for controlling engine rotational speed in accordance with the second control characteristic line 59; and a third engine speed control section 63 for controlling engine rotational speed in accordance with the third control characteristic line 60.

The first control characteristic line 58 is intended to adjust the rotational speed of the engine 18 to a high speed level in a working device 8's speed-oriented manner, and more specifically, for example, the first control characteristic line 58 is intended to adjust the engine rotational speed to a rated speed under a condition where the accelerator pedal 21 is fully depressed.

The second control characteristic line 59 is intended to adjust the rotational speed of the engine 18 to a low speed level (to be lower than the speed defined by the first control characteristic line 58) in a fuel economy-oriented manner.

The third control characteristic line 60, which is located between the first control characteristic line 58 and the second control characteristic line 59, is intended to adjust the rotational speed of the engine 18 to a speed level which falls in between the speed defined by the first control characteristic line 58 and the speed defined by the second control characteristic line 59.

In this embodiment, the maximum engine rotational speed corresponding to the first control characteristic line 58 (a speed to be obtained at the time of full depression of the accelerator pedal 2) is set at 2400 rpm; the maximum engine rotational speed corresponding to the second control characteristic line 59 is set at 1800 rpm; and the maximum engine rotational speed corresponding to the third control characteristic line 60 is set at 2200 rpm.

During execution of work with the working device 8, the first engine speed control section 61 of the control unit 20 controls the rotational speed of the engine 18 in accordance with the first control characteristic line 58. This makes it possible to conduct work with high efficiency.

During execution of work with the working device 8, the inching pedal 22 is operated to start and stop the wheel loader 1 repeatedly in small movements (move the wheel loader 1 forward or backward inch by inch), which is so-called inching operation (inching travel). Moreover, during execution of work with the working device 8, in the interest of speeding up of the operation of the working device 8, the starting and stopping of the wheel loader and vehicle acceleration and deceleration are effected by the inching pedal 22, with the engine rotational speed maintained high by the accelerator pedal 21. Thus, since the inching pedal 22 is used to carry out work with the working device 8, in this embodiment, execution of work with the working device 8 is identified by the presence of operation of the inching pedal 22. That is, during the operation of the inching pedal 22, the first engine speed control section 61 controls engine rotational speed in accordance with the first control characteristic line 58.

Execution of work with the working device 8 may be identified also by the detection of operation of the lift arm 9 and the bucket 10 or operation of the working-device operation lever 17, However, in this case, extra detection means, such as a sensor, needs to be provided. In contrast, in the wheel loader 1 of the present embodiment, in order to control the control pressure for the swash plate of the HST pump 26, the amount of operation of the inching pedal 22 is detected by the inching position sensor 51, and the result of detection is inputted to the control unit 20. Accordingly, the detection of pedal depressing operation by the inching position sensor 51 can be utilized to identify execution of work with the working device 8. This affords the advantage to eliminate the need for providing extra detection means to identify execution of work with the working device 8.

Meanwhile, on a run (during the travel of the wheel loader without execution of work), when a travel load is smaller than a predetermined load, the second engine speed control section 62 of the control unit 20 controls the rotational speed of the engine 18 in accordance with the second control characteristic line 59, and on the other hand, when a travel load is greater than or equal to the predetermined load, the third engine speed control section 63 of the control unit 20 controls the rotational speed of the engine 18 in accordance with the third control characteristic line 60.

For example, on a smooth road run, the rotational speed of the engine 18 is controlled in accordance with the second control characteristic line 59, and, when a travel load greater than or equal to the predetermined load is imposed on the wheel loader 1 on an uphill slope run, the rotational speed of the engine 18 is controlled in accordance with the third control characteristic line 60. In this way, a sufficient reduction in fuel consumption can be achieved.

Figure 4B:
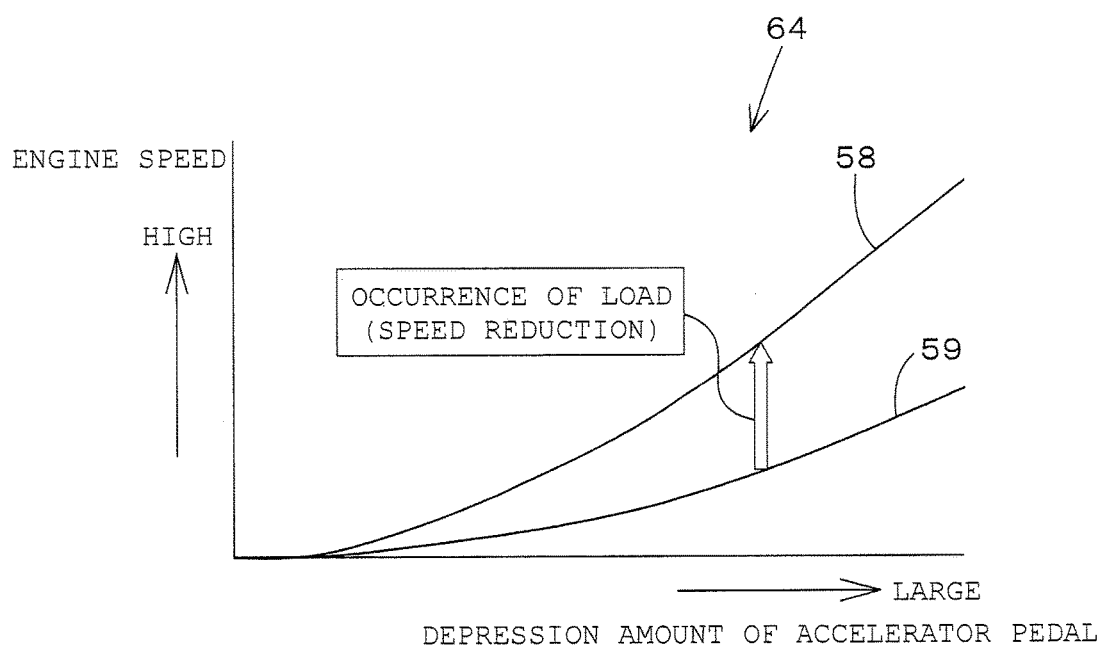
FIG. 4B is an engine speed control map related to a comparative example.

That is, in a case where the rotational speed of the engine 18 is controlled in conformity to an engine speed control map 64 as shown in FIG. 4B (a map which bears the first control characteristic line 58 and the second control characteristic line 59, but is devoid of the third control characteristic line 60), if a travel load becomes greater than or equal to the predetermined load frequently on a run, the engine will be controlled so as to operate at high speed, which makes it impossible to achieve a sufficient reduction in fuel consumption. Furthermore, if the engine rotational speed corresponding to the case where a load becomes greater than or equal to the predetermined load is set to be lower than the engine rotational speed corresponding to the case of exercising control in accordance with the first control characteristic line 58, during execution of work with the working device 8, the operation speed of the working device 8 will be decreased. Therefore, with consideration given to the efficiency of work with the working device 8 (a decrease in working speed), the engine rotational speed corresponding to the case where the load becomes greater than or equal to the predetermined load cannot be decreased greatly.

In view of this, as shown in FIG. 4A, in addition to the first control characteristic line 58 and the second control characteristic line 59, the third control characteristic line 60 is provided, whereby different control characteristic lines for engine speed control can be used for each of two cases, namely a case where, on a run under a travel load smaller than a predetermined load, the travel load becomes greater than or equal to the predetermined load, and a case where working is carried out with the working device 8. This makes it possible to achieve both a sufficient reduction in fuel consumption and highly efficient execution of work.

It is noted that, on a run without execution of work, upon stepping on the inching pedal, engine rotational speed is changed to a high speed level defined by the first control characteristic line 58. However, on a run without execution of work, speed reduction is generally effected by releasing the accelerator pedal, wherefore there arises no problem.

Moreover, in the normal mode and the attachment mode, the rotational speed of the engine 18 is controlled in accordance with the first control characteristic line 58 irrespective of the level of a travel load. This allows selection between speed-oriented travel and fuel economy-oriented travel.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

The texts of Japanese application Nos. 2013-66533 and 2012-66534 filed on Mar. 27, 2013 are hereby incorporated by references.

The invention claimed is:

1. A working machine comprising:
a HST pump constituted of a swash plate-type variable displacement pump which is driven by an engine;
a HST motor making a closed-circuit connection with the HST pump via a pair of speed-change oil passages, for driving a traveling device by being driven with oil discharged from the HST pump;
an accelerator pedal to control vehicle speed;
a control unit to control an engine rotational speed and a swash plate of the HST pump, the engine rotational speed being a rotational speed of the engine;
the control unit having:
a normal mode for exercising vehicle speed control by controlling engine rotational speed on the basis of an amount of operation of the accelerator pedal and by controlling a swash plate of the HST pump on the basis of the engine rotational speed; and
an attachment mode for exercising vehicle speed control by controlling the swash plate of the HST pump on the basis of the amount of operation of the accelerator pedal irrespective of engine rotational speed;
an accelerator setting member to set the engine rotational speed separately from the accelerator pedal;
a servo cylinder to change an angle of the swash plate of the HST pump and to tilt the swash plate to operate the HST motor forward or backward;
a swash-plate control valve constituted of an electromagnetic proportional valve to supply a control pressure to the servo cylinder, the control pressure being used for changing the angle of the swash plate based on a command signal outputted from the control unit;
a forward-backward selector valve connected to the swash-plate control valve via a control-pressure supply passage and connected to the servo cylinder via a forward oil passage and a backward oil passage, the forward-backward selector valve being configured to be switched between:
a neutral position to disconnect the control-pressure supply passage from the forward oil passage and the backward oil passage,
a forward-travel position to connect the control-pressure supply passage to the forward oil passage, the forward-travel position thus supplying the control pressure from the swash-plate control valve to the servo cylinder to operate the HST motor forward, and
a backward-travel position to connect the control-pressure supply passage to the backward oil passage, the backward-travel position thus supplying the control pressure from the swash-plate control valve to the servo cylinder to operate the HST motor backward;
an accelerator position sensor to detect the amount of operation of the accelerator pedal and to input the amount to the control unit; and
a working device for execution of work,
wherein
the control unit in the normal mode outputs a first command signal to the engine, thereby changing the engine rotational speed in accordance with the amount of operation of the accelerator pedal, and outputs a second command signal to the swash-plate control valve, thereby changing the angle of the swash plate in accordance with the engine rotational speed changed based on the first command signal,
the control unit in the attachment mode outputs a third command signal to the engine, the third command signal being based on the engine rotational speed set by accelerator setting member, without outputting to the engine a signal being for changing the engine rotational speed in accordance with the amount of operation of the accelerator pedal, the amount being detected by the accelerator position sensor, thereby maintaining the engine rotational speed, and
the control unit in the attachment mode outputs a fourth command signal to the swash-plate control valve, the fourth command signal being based on the amount of operation of the accelerator pedal, thereby changing the angle of the swash plate in accordance with the amount of operation of the accelerator pedal,
wherein the traveling device includes:
a wheel; and
a transmission shaft to be rotated by the engine and to transmit the rotation to the wheel,
the control unit controls the engine rotational speed on the basis of first to third control characteristic lines that define a relationship between the amount of operation of the accelerator pedal and engine rotational speed, and the control unit comprises:

a first engine speed control section to control the engine rotational speed in accordance with the first control characteristic line during execution of work with the working device;

a second engine speed control section to control the engine rotational speed in accordance with the second control characteristic line when a travel load is smaller than a predetermined load on a run; and a third engine speed control section to determine, when an actual vehicle speed is lower than a target vehicle speed, that a travel load is applied to the working machine, the actual vehicle speed being obtained based on a value detected by a rotation sensor that is configured to detect a rotational speed of the transmission shaft, the target vehicle speed corresponding to a command value of engine rotational speed outputted from the control unit, and then to control the engine rotational speed in accordance with the third control characteristic line, located between the first control characteristic line and the second control characteristic line, when a travel load is greater than or equal to the predetermined load on a run.

2. The working machine of claim 1, further comprising:

an inching position sensor to detect an amount of operation of the inching pedal and to input the detected amount to the control unit, wherein, in the normal mode and the attachment mode, a command signal is outputted from the control unit to the swash-plate control valve in a manner such that the control pressure for the swash plate of the HST pump will be lowered through depressing operation of the inching pedal.

3. The working machine of claim 1, further comprising:

a servo cylinder to control the swash plate of the HST pump;

a swash-plate control valve constituted of an electromagnetic proportional valve, the swash-plate control valve being configured to feed hydraulic oil from a hydraulic pump which is driven by an engine to the servo cylinder as a control pressure for the swash plate;

an inching pedal to decrease vehicle speed; and an inching position sensor to detect an amount of depression of the inching pedal and to input the detected amount to the control unit, wherein the swash-plate control valve is controlled under a command signal outputted from the control unit in a manner such that the control pressure for the swash plate will be lowered through depressing operation of the inching pedal, and wherein the first engine speed control section controls engine speed in accordance with the first control characteristic line during the operation of the inching pedal.

4. The working machine of claim 1, wherein selection between the normal mode and an economical mode can be made, and wherein, in the normal mode, engine rotational speed is controlled in accordance with the first control characteristic line alone, and, in the economical mode, engine rotational speed is controlled by the first to third engine speed control sections.

5. A working machine comprising:

a HST pump utilizing a swash plate-type variable displacement pump which is driven by an engine;

a HST motor connected with the HST pump via a pair of speed-change oil passages, for driving a traveling device by being driven with oil discharged from the HST pump;

an accelerator pedal;

a control unit controlling an engine rotational speed and a swash plate of the HST pump, the engine rotational speed being a rotational speed of the engine;

the control unit having a normal mode and an attachment mode;

the normal mode exercising vehicle speed control by controlling engine rotational speed on the basis of an amount of operation of the accelerator pedal and by controlling a swash plate of the HST pump on the basis of the engine rotational speed; and the attachment mode exercising vehicle speed control by controlling the swash plate of the HST pump on the basis of the amount of operation of the accelerator pedal irrespective of engine rotational speed;

an accelerator setting member setting the engine rotational speed separately from the accelerator pedal;

a servo cylinder configured to change an angle of the swash plate of the HST pump and to tilt the swash plate to operate the HST motor forward or backward;

a swash-plate control valve utilizing an electromagnetic proportional valve to supply a control pressure to the servo cylinder, the control pressure being used for changing the angle of the swash plate based on a command signal outputted from the control unit;

a forward-backward selector valve connected to the swash-plate control valve via a control-pressure supply passage and connected to the servo cylinder via a forward oil passage and a backward oil passage, the forward-backward selector valve being configured to be switched between;

a neutral position that disconnects the control-pressure supply passage from the forward oil passage and the backward oil passage, a forward-travel position that connects the control-pressure supply passage to the forward oil passage, the forward-travel position thus supplying the control pressure from the swash-plate control valve to the servo cylinder to operate the HST motor forward, and a backward-travel position that connects the control-pressure supply passage to the backward oil passage, the backward-travel position thus supplying the control pressure from the swash-plate control valve to the servo cylinder to operate the HST motor backward; and an accelerator position sensor to detect the amount of operation of the accelerator pedal and to input the amount to the control unit; and a working device for execution of work, wherein the control unit in the normal mode outputs a first command signal to the engine, thereby changing the engine rotational speed in accordance with the amount of operation of the accelerator pedal, and outputs a second command signal to the swash-plate control valve, thereby changing the angle of the swash plate in accordance with the engine rotational speed changed based on the first command signal, the control unit in the attachment mode outputs a third command signal to the engine, the third command signal being based on the engine rotational speed set by accelerator setting member, without outputting to the engine a signal being for changing the engine rotational speed in accordance with the amount of operation of the accelerator pedal, the amount being detected by the accelerator position sensor, thereby maintaining the engine rotational speed, and the control unit in the attachment mode outputs a fourth command signal to the swash-plate control valve, the fourth command signal being based on the amount of operation of the accelerator pedal, thereby changing the angle of the swash plate in accordance with the amount of operation of the accelerator pedal, the traveling device includes:

a wheel; and a transmission shaft to be rotated by the engine and to transmit the rotation to the wheel, the control unit controls the engine rotational speed on the basis of first to third control characteristic lines that define a relationship between the amount of operation of the accelerator pedal and engine rotational speed, and the control unit comprises:

a first engine speed control section to control the engine rotational speed in accordance with the first control characteristic line during execution of work with the working device;

a second engine speed control section to control the engine rotational speed in accordance with the second control characteristic line when a travel load is smaller than a predetermined load on a run; and a third engine speed control section to determine, when an actual vehicle speed is lower than a target vehicle speed, that a travel load is applied to the working machine, the actual vehicle speed being obtained based on a value detected by a rotation sensor that is configured to detect a rotational speed of the transmission shaft, the target vehicle speed corresponding to a command value of engine rotational speed outputted from the control unit, and then to control the engine rotational speed in accordance with the third control characteristic line, located between the first control characteristic line and the second control characteristic line, when a travel load is greater than or equal to the predetermined load on a run.

\* \* \* \* \*